United States Patent [19]

Mooney, III et al.

[11] Patent Number: 5,744,280
[45] Date of Patent: Apr. 28, 1998

[54] STORAGE-STABLE PHOTOIMAGEABLE DEUTERO LEUCO DYE/PHOTOOXIDATION COMPOSITIONS WITH IMPROVED LEUCO DYE

[75] Inventors: William Frank Mooney, III, Sayre, Pa.; Jeffrey J. Patricia, Apalachin, N.Y.

[73] Assignee: E. I. du Pont de Nemours and Company, Wilmington, Del.

[21] Appl. No.: 711,764

[22] Filed: Sep. 5, 1996

[51] Int. Cl.$^6$ .............................. G03C 1/492; G03F 5/00
[52] U.S. Cl. .................. 430/270.1; 430/320; 430/915; 430/325
[58] Field of Search .................... 430/270.1, 915, 430/320, 325

[56] References Cited

U.S. PATENT DOCUMENTS

| | | | |
|---|---|---|---|
| 3,598,592 | 8/1971 | Cescon | 96/85 |
| 4,602,263 | 7/1986 | Borror et al. | 346/201 |
| 4,720,449 | 1/1988 | Borror et al. | 430/338 |
| 4,945,020 | 7/1990 | Kempf et al. | 430/49 |
| 5,236,884 | 8/1993 | Boggs et al. | 503/201 |
| 5,256,618 | 10/1993 | Takahashi et al. | 503/216 |
| 5,350,870 | 9/1994 | Boggs et al. | 560/27 |
| 5,391,748 | 2/1995 | Berneth | 546/165 |
| 5,395,736 | 3/1995 | Grasshoff et al. | 430/270 |
| 5,445,917 | 8/1995 | Grasshoff et al. | 430/270 |
| 5,449,657 | 9/1995 | Takahashi | 503/216 |
| 5,453,345 | 9/1995 | Grasshoff et al. | 430/270 |
| 5,527,655 | 6/1996 | Bonham et al. | 430/175 |
| 5,534,388 | 7/1996 | Grasshoff et al. | 430/338 |

OTHER PUBLICATIONS

Richie, C P. et al., "Application of Linear Free Energy Relationships to Some Reactions of Triarylmethane Derivatives," *J.Am.Chem.Soc.*, 84, 2349, 1962.

MacLachlan, A., "The Carbon Tetrachloride Sensitized Photooxidation of Leuco Ethyl Crystal Violet," *J.Phys.Chem.*, 71, 718, 1967.

Lewis, E. S., et al. "Rates and Isotope Effects in the Quinone Oxidation of Leuco Triphenylmethane Dyes," *J.Am.Chem. Soc.*, 92, 899–905, 1970.

MacLachlan, A., et al., "The Biimidazole–Sensitized Photooxidation of Leuco Triphenylmethane Dyes," *J.Org.Chem.*, 36, 16, 2275–2280, 1971.

Ayyangar, N. R., et al., "Basic Dyes," *The Chemistry of Synthetic Dyes*, IV, 103–160, 1971.

Saeva, F. D., et al., "Carbocation Photochemistry. Electron Transfer Mechanism for the Pyrylium Salt Sensitized Photo–oxidation of Leuco Crystal Violet," *J.C.S.Chem.Comm.*, 943–944, 1976.

Kuder, J. E., et al., "Anodic and Photochemical Oxidation of Triphenylmethanes," *J.Org.Chem.*,44(5), 761–766, 1979.

Hinzmann, G., et al., "Photooxidatoin of Leuco Duyes. VIII [1], Time Resolved Investigations of the Mechanism of the Photooxidation of Leucocrystal Violet," *J.Prakt.Chem.*, 326, 6:899–909, 1984.

Nishimura, N., et al., "Mechanism of the Hydride Transfer Reaction of Leuco Crystal Violet with Cyanomethylene Acceptors," *J.Phys.Org.Chem.*, 7, 218–220, 1994.

Rates and Isotope Effects in the Quinone Oxidation of Leuco Triphenylmethane Dyes, Lewis et al., J. Amer. Chem. Soc., vol. 92, 1970, pp. 899–905.

Application of Linear Free Energy Relationships to Some Reactions of Triarylmethane Derivatives, Ritchie et al., J. Amer. Chem. Soc. vol. 84 (12), 1962, pp. 2349–2356.

Kinetics of Hydrogen–Deuterium Exchange in the Methine Chain of Simple Polymethine, Radeglia et al., 1978.

Carbocation Photochemistry. Electron Transfer Mechanism for the Pyrylium Salt Sensitized Photo–Oxidation of Leuco Crystal Violet, Saeva et al., Journal of the Chemical Society, vol. 22, 1976, pp. 943–944.

Hawley's Condensed Chemical Dictionary, Van Nostrand, NY, 1993, p. 357.

*Primary Examiner*—Janet C. Baxter
*Assistant Examiner*—Rosemary Ashton

[57] ABSTRACT

Storage-stable photoimageable leuco dye/photooxidant compositions and imaging processes utilizing these compositions are disclosed. These compositions comprise deuterated leuco compounds, e.g., deuterated aminotriarylmethanes, wherein the extent of deuteration is preferably at least 60%. These new compositions and the processes utilizing these new compositions afford improved monochrome images having enhanced film stabilities and image contrast characteristics, wherein desirable higher optical densities in imaged areas ($D_{imaged}$) and desirable lower optical densities in unimaged areas ($D_{unimaged}$, $D_{fixed}$, and $D_{forced}$) are simultaneously both achieved in accordance with the compositions and processes of the instant invention.

24 Claims, No Drawings

STORAGE-STABLE PHOTOIMAGEABLE DEUTERO LEUCO DYE/PHOTOOXIDATION COMPOSITIONS WITH IMPROVED LEUCO DYE

FIELD OF THE INVENTION

This invention is concerned with storage-stable, photoimageable, color-forming compositions. More particularly, the compositions of this invention comprise a selected deuterated leuco dye color-former(s) and a selected photooxidant(s). The invention is also directed to a process for forming color images employing such compositions.

BACKGROUND OF THE INVENTION

There is a continuing need for improved, storage-stable photoimageable compositions capable of forming a monochrome image that have enhanced image contrast properties. Such compositions are useful for a variety of applications, such as, for example, being the imaging medium for a monochrome proofing paper system.

Certain photoimageable leuco dye/photooxidant compositions that afford desirable hues upon photoimaging are destabilized toward thermal color formation. While not being bound by any theory, it is believed that this thermal color formation results from reaction of the leuco dye(s) with explicit acid (e.g., p-toluene sulfonic acid), oxygen, and/or other component(s) of the photoimageable compositions. This tendency toward thermal color formation can be experimentally characterized in there being undesirably high optical densities (e.g., undesirably high $D_{unimaged}$ values) measured for aged samples on unexposed paper substrates. Furthermore, the presence of explicit acid and/or other components is often necessary in these photoimageable compositions in order for them to function adequately in commercially viable formulations. Illustratively, if the explicit acid were to simply be removed, this would lead to significantly lower $D_{imaged}$ optical density values, which is unacceptable. Thus removal of the explicit acid, as well as other key components, is most often not a viable option, and there is a continuing need for improved photoimageable leuco dye/photooxidant compositions having reduced tendency to undergo thermal color formation and concomitant greater stability when explicit acid is a component(s) in the compositions.

Surprisingly, it has been found that photoimageable compositions of the type disclosed herein in which a deuteurated leuco compound is utilized in place of the usual, corresponding hydrido leuco compound results in the composition having significantly improved contrast imaging characteristics. More specifically, the use of a deuterated aminotriarylmethane or deuterated xanthene compound in place of the usual, corresponding hydrido aminotriarylmethane or xanthene compound affords strong image optical density (high $D_{imaged}$) with essentially the same hue as that of the corresponding hydrido aminotriarylmethane or xanthene compound upon imaging of compositions of this invention. Furthermore, there is a substantial decrease in the $D_{unimaged}$ optical density, especially after aging with use of the deuterated compositions of this invention. Still further, there is good photodeactivation (low $D_{fixed}$ and $D_{forced}$) under suitable conditions with use of the deuterated compositions of this invention. Thus, overall, the compositions and processes of this invention with use of suitable deuterated aminotriarylmethane or xanthene leuco compound(s) afford improved and enhanced image contrast characteristics.

SUMMARY OF THE INVENTION

Storage-stable photoimageable leuco dye/photooxidant compositions with improved leuco dyes are claimed herein.

The improved leuco dyes are aminotriarylmethane compounds or related compounds in which the methine (central) carbon atom has been preferably deuterated to the extent of at least 60% with deuterium incorporation in place of the corresponding hydrido aminotriaryl-methane. The present invention includes any percentage of deuterium which leads to improved performance relative to the analogous pure hydrido compound in the compositions of the invention. Thus the range of deuterium for any particular leuco dye is between a level approaching 0% and 100%. Also claimed are processes for preparing an image on a substrate using the photoimageable compositions of the present invention. The photoimageable compositions and processes of this invention afford images having enhanced image contrast properties and film stability as explained in more detail below.

The storage-stable, photoimageable compositions of this invention comprise:

(a) at least one deuterated leuco dye and/or salt thereof, and (b) at least one photooxidant.

In preferred embodiments, the storage-stable, photoimageable compositions of this invention contain at least one deuterated leuco dye and/or salt thereof which is present in the composition in a weight percentage of at least 60% relative to the non-deuterated version thereof and, which is selected from a compound of the formula II or III (shown following the Examples) wherein $R^1$ is a single or multiple substituent and is selected from $CH_3$, $C_2H_5$, $C_3H_7$ or OH; $R^2$-$R^3$ are independently selected from the group consisting of $CH_3$, $C_2H_5$, $C_3H_7$, $C_2H_4OCH_3$, $C_2H_4OC_2H_5$, $CH_2OCH_3$, and $CH_2OC_2H_5$;

or from a compound of the formula V or VI (as shown following the Examples) wherein $R^1$ is a single or multiple substituent and is selected from —N[(C1–C5 alkyl)(aryl)]$_2$, —N(C1–C6 alkyl)$_2$, —HN(Ph)X, —CH$_3$, —OH or —OCH$_3$. $R^2$ and $R^3$ are independently selected from the group consisting of C1–C6 alkyl and C4–C7 cycloalkyl; $R^4$ is selected from the group consisting of H, COOH, CO$_2$R$^5$, wherein $R^5$ represents C1–C6 alkyl; A is selected from the group consisting of O and S; and $$\boxed{AR}$$

represents an aromatic ring structure comprised of at least one C6–C10 aromatic ring that is unsubstituted or substituted with one or more of C1–C6 alkyl, alkyl-substituted amino, aryl-substituted amino, and arylalkyl-substituted amino.

DETAILED DESCRIPTION OF THE INVENTION (A) The Deuterated Leuco Compound

The deuterated leuco form of the dye which comprises one component of a photoimaging composition of the present invention is the reduced form of the dye having one or two deuterium atoms, the removal of which together with an additional electron in certain cases produces the dye. Such dyes have been described, for example, in U.S. Pat. No. 3,445,234, column 2, line 49 to column 8, line 55. The following classes are included:

(a) deuterated aminotriarylmethanes (b) deuterated aminoxanthenes (c) deuterated aminothioxanthenes (d) deuterated amino-9,10-dihydroacridines (e) deuterated aminophenoxazines
(f) deuterated aminophenothiazines
(g) deuterated aminodihydrophenazines
(h) deuterated aminodiphenylmethanes
(i) deuterated leuco indamines
(j) deuterated aminohydrocinnamic acids (cyanoethanes, leuco methines)
(k) deuterated hydrazines
(l) deuterated leuco indigoid dyes
(m) deuterated amino-2,3-dihydroanthraquinones
(n) deuterated tetrahalo-p,p'-biphenols
(I) deuterated 2(p-hydroxyphenyl)-4,5-diphenylimidazoles
(p) deuterated phenethylanilines Of these leuco forms, (a) through (c) and (e) form the dye by losing one deuterium/hydrogen atom, while the leuco forms (d) and () through (p) lose two deuterium/hydrogen atoms to produce the parent dye. Deuterated aminotriarylmethanes (class a) and deuterated aminoxanthenes (class b) are preferred. Aminotriarylmethanes of formula I or II–VI are preferred and of formula I–III are most preferred wherein, in the case of formula I (shown following the examples) the deuterated leuco dye or salt thereof is selected from a compound wherein L is an aryl moiety

selected from phenyl or naphthyl or a 9–11 membered bicyclic heteroaryl moiety

having 1–3 hetetoatoms selected from $NR^2$, S or O wherein the aryl or heteroaryl ring may be unsubstituted or substituted with $R^1$ which is selected from —$NR^2R^3$, —$(CH_2)_nC(O)O(C1-C6\ alkyl)$, —X, —$(CH_2)_nO(C1-C6\ alkyl)$, —OH, —(C1–C6 alkyl), Y is an aryl moiety

selected from the phenyl or napthyl or a 9–11 membered bicyclic heteroaryl moiety

having 1–3 heteroatoms selected from $NR_2$, S or O wherein the aryl or heteroaryl ring may be unsubstituted or substituted with $R^1$ which is selected from —$NR^2R^3$, —$(CH_2)_nC(O)O(C1-C6\ alkyl)$, —X, —$(CH_2)_nO(C1-C6\ alkyl)$, —OH, —(C1–C6 alkyl);

Z is an aryl moiety

selected from phenyl or naphthyl wherein the aryl ring may be unsubstituted or substituted with $R^1$ which is selected from —$NR^2R^3$, —$(CH_2)_nC(O))(C1-C6\ alkyl)$, —X, —$(CH_2)_nO(C1-C6\ alkyl)$, —OH, —(C1–C6 alkyl);

$R^2$ or $R^3$ are independently selected from H, C1–C6 alkyl, C1–C6 alkylaryl, aryl, C4–C7 cycloalkyl, —$(CH_2)_nO$(C1–C6 alkyl);

X is selected from Cl, Br, F or I;

n is 0–6, wherein at least two or more groups L, Y and Z may, through the central methine carbon atom of formula I, bridge to form at least one additional 5–8 membered ring, having at least one heteroatom (A) chosen from $NR_2$, O or S.

The present invention preferably includes a composition as above wherein L or Y are independently selected from the group of formula

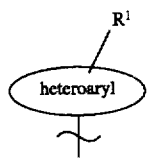

or

Z is selected from a group of the formula

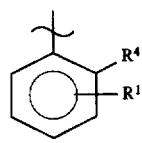

wherein $R^1$ is selected from —$NR^2R^3$, —$(CH_2)_nC(O)O(C1-C^6\ alkyl)$, —X, —$(CH_2)_nO(C1-C6\ alkyl)$, —OH, —(C1–C6 alkyl);

$R^2$ or $R^3$ are independently selected from H, C1–C6 alkyl, C1–C6 alkylaryl, aryl, C4–C7 cycloalkyl, $(CH_2)_nO$ (C1–C6 alkyl) wherein the aryl groups may be unsubstituted or substituted with typical aromatic subsituents such as halogen, hydroxy, methoxy, $CF_3$;

$R^4$ is selected from —OH, —$C(O)O(C1-C6\ alkyl)$, or (C1–C6 alkyl).

The present invention preferably relates to those compositions which contain compounds of formula II–IV (shown following the examples) wherein $R^1$ is selected from —$NR^2R^3$, —C(O)OC1–C6 alkyl, Cl, Br, F or I, C1–C6 alkyl, —OH, —OC1–C6 alkyl; and $R^2$ or $R^3$ are independently selected from H, C1–C6 alkyl, C1–C6 alkylphenyl, chlorophenyl, cyclohexyl, phenyl, C1–C6 alkyloxyC1–C6 alkyl;

$R^4$ is selected from $C(O)O(C1-C6\ alkyl)$.

The leuco dye is generally present in 0.1 to 5.0 percent by weight of solids in the photoimaging composition. The present invention, however, includes compositions wherein the leuco dye ranges from greater than 0 to about 50%.

With the leuco form of dyes which have amino or substituted amino groups within the dye structure and which are characterized as cationic dyes, an amine salt-forming mineral acid, organic acid, or an acid from a compound

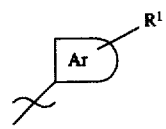

supplying acid usually is employed. The amount of acid usually varies from >0 (greater than zero) mol to 20 mol per mol of leuco dye. The preferred quantity of acid is about 0.5 to 5.0 mol per mol of leuco dye. Representative acids which form the required amine salts are hydrochloric, hydrobromic, sulfuric, phosphoric, aetic, oxalic, p-toluenesulfonic, trichloroacetic, trifluoroacetic and perfluoroheptanoic acid. Other acids such as acids in the "Lewis" sense or acid sources whch may be employed in the presence of water or moisture include zinc chloride, zinc chloride, zinc bromide, and ferric chloride. Representative leuco dye salts include tris-(4-diethylamino-o-tolyl) methane zinc chloride, tris-4-diethylamino-o-tolyl) methane oxalate, tris-(4-diethylamino-o-tolyl) methane p-toluenesulfonate and the like.

Deuteration to the extent of between (greater than) >0% to 100% relative to the non-deuterated version provides enhanced properties to the compositions related herein. The preferred extent of deuteration is at least 60% and the more preferred extent of deuteration is at least 80%. LECV and D-LECV are leuco compounds which are colorless in the unoxidized leuco form but are converted to intensely colored dyes upon oxidation with a suitable oxidizing agent.

In general, deuterated leuco (colorless form) dyes of formula I-VI can be synthetically prepared by treating the corresponding dyes (colored form) with a suitable deuterating agent. Preferably, this is done by adding a deuterating agent to a solution of the dye. Suitable deuterating agents include, but are not limited to, sodium borodeuteride, lithium aluminum deuteride, and sodium deuteride. As one example, D-LECV, which is in the formula I class, can be prepared by treating the corresponding dye, ECV (Ethyl Violet), with sodium borodeuteride or lithium aluminum deuteride to afford D-LECV.

Alternatively, the deuterated leuco (colorless form) dyes of formula I-VI can be synthetically prepared by starting with the corresponding hydrido leuco dye. The hydrido leuco dye is first oxidized to the corresponding dye using a suitable oxidizing agent. Suitable oxidizing agents include chloranil, oxygen and hydrogen peroxide. The corresponding dye, now in non-leuco form, can either be isolated and then reacted with a suitable deuterating agent as given above to form the deuterated leuco compound or it can be reacted in situ without intermediate product isolation to form the deuterated leuco compound. As one example, D-LECV, which is in the formula I class, can be prepared from LECV, by oxidation of LECV with chloranil to form ECV, and subsequently reducing ECV with sodium borodeuteride or lithium aluminum deuteride to afford D-LECV.

(B) The Photooxidant

A wide variety of different photooxidants can be employed in this invention. Suitable photooxidants include, but are not limited to, the following: (a) a hexaarylbiimidazole compound (HABI), (b) a halogenated compound having a bond dissociation energy to produce a first halogen as a free radical of not less than about 40 kilocalories per mole, and having not more than one hydrogen attached thereto, (c) a sulfonyl halide, R-SO2-X wherein R is a member of the group consisting of alkyl, alkenyl, cycloalkyl, aryl, alkaryl, or aralkyl and X is chlorine or bromine, (d) a sulfenyl halide of the formula R'—S—X' wherein R' and X' have the same meaning as R and X in RSO$_2$X above, (e) a tetraaryl hydrazine, (f) a benzothiazolyl disulfide, (g) a polymethacrylaldehyde, (h) an alkylidene 2,5-cyclohexadien-1-one, (i) azobenzyl, (j) nitroso, (k) alkyl (T1), (l) peroxides, and (m) haloamines.

A hexaarylbiimidazole compound (HABI) is a preferred photooxidant in this invention. The parent HABI is the compound having the name of 2,4,5,2',4',5'-hexaphenylbimidazole and which upon exposure to actinic radiation undergo dissociation into two triarylimidazole (lophyl) radicals, which in turn inititate photoimaging by oxidation of the colorless or nearly colorless leuco dye into the colored form. Substituted HABIs are known in which one or more hydrogen atoms are substituted with substituents that include, but are not limited to, chlorine, bromine, methoxy, and ethoxy.

A HABI photoinitiator or photoinitiating system includes one or more hexaarylbiimidazole (HABI) compounds which directly and/or indirectly via photosensitization furnish free-radicals when activated by actinic radiation. By "actinic radiation" is meant radiation which allows formation of the free-radicals necessary to initiate photoimaging by leuco dye oxidation to form color and/or polymerization of the monomer if present. This photoinitiating system can also include a plurality of compounds, one or more of which yields the free-radicals after having been caused to do so by another compound, a photosensitizer or sensitizer, which is activated by the radiation. Photosensitizers within the scope of this invention include those active in the ultraviolet, visible, and near IR regions of the electro-magnetic spectrum. Ultraviolet and visible sensitizers are well known to those skilled in the art and, illustratively, include those disclosed in U.S. Pat. Nos. 4,162,162; 4,535,052; 4,341,860; 5,153,100; 4,565, 769; 4,917,977; 4,987,230; 5,147,758, 5,204,467, 5,236, 808; and 5,256,520. Near infrared (Near IR) photosensitizers are also suitable in this invention, including those squarylium dye Near IR photosensitizers disclosed in U.S. Pat. No. 5,019,549 and the near IR photosensitizers disclosed in U.S. Pat. No. 4,882,265.

Photoinitiators, including HABI-type photoinitiators, are discussed in: "Photopolymers: Radiation Curable Imaging Systems" by B. M. Monroe in Radiation Curing: Science and Technology, S. P. Pappas, Ed, Plenum, New York, 1992, pp. 399–440, and by K. K. Dietliker, in Chemistry and Technology of UV and EB Formulation for Coatings, Inks, and Paints, "Free-Radical Polymerization", P. K. T. Oldring, Ed, SITA Technology Ltd, London, Vol. 3, 1991, pp 60–525.

The substituted 2,4,5,2',4', 5'-hexaarylbiimidazole dimers (HABIs) are illustratively compounds which are often preferred in photoimageable compositions and are disclosed in: Chambers, U.S. Pat. No. 3,479,185; Cescon, U.S. Pat. No. 3,784,557; Dessauer, U.S. Pat. No. 4,311,783; and Sheets, U.S. Pat. No. 4,622,286. Preferred dimers of this class are 2-o-chlorosubstituted hexaphenylbiimidazoles in which the other positions on the phenyl radicals are unsubstituted or substituted with chloro, methyl or methoxy, such as: CDM-HABI, i.e., 2-(o-chlorophenyl)-4,5-bis(m-methoxyphenyl)-imidazole dimer; o-C1-HABI, i.e., biimidazole, 2,2'-bis (o-chlorophenyl)-4,4'5,5'-tetraphenyl-; and TCTM-HABI, i.e., 1H-imidazole, 2,5-bis(o-chloro-phenyl)-4-[3,4-dimethoxyphenyl]-, dimer, each of which is typically used with a hydrogen donor or chain transfer agent. Preferred initiators of this class include, but are not limited to:

1) TCDM-HABI="trichlorodimethoxy-hexaarylbiimidazole"=2,2',5-tris(2-chlorophenyl)-4-(3, 4-dimethoxyphenyl)-4,5-diphenylbiimidazole (and isomers);

2) 2,2'-bis(2-ethoxyphenyl)-4,4'5,5'-tetraphenyl-1,1'-bi-1H-imidazole [CAS RN 1842-62-2]; and 3) 2,2'-di-1-naphthalenyl-4,4',5,5'-tetraphenyl-1'-bi-1H-imidazole [CAS RN 1741-29-3]

The specific photooxidant(s) in this invention are present in 0.1 to 30 percent by weight of solids in the photoimaging compositions; preferably they are present in 0.1 to 20 percent by weight of solids; and most preferably they arepresent in 0.1 to 10 percent by weight of solids. The specific triphenylimidazolyl dimer(s) (HABI(s)), the preferred photooxidants, are present in 0.1 to 15.0 percent by weight of solids in the photoimaging compositions.

The specific photooxidants in this invention may include, but are not required to include, a photosensitizer to sensitize formation of a photooxidant(s), such as a lophyl radical generated from a HABI.

(C) Photodeactivation Compound

A suitable photodeactivation compound can be employed in this invention. Preferred are various quinone compounds. A redox couple useful in the photoimaging composition is described in U.S. Pat. No. 3,658,543, column 9, lines 1 to 46. Preferred oxidants include 9,10-phenanthrenequinone alone or in admixture with 1,6- and 1,8-pyrenequinone which absorb principally in the 430 to 550 nm region. The reductant component of the redox couple is 100 to 1 percent of an acyl ester of triethanolamine of the formula:

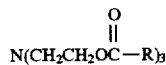

where R is alkyl of 1 to 4 carbon atoms, and 0 to 99 percent of a C1 to C4 alkyl ester of nitrilotriacetic acid or of 3,3',3"-nitrilotripropionic acid. Triethanolamine triacetate and dibenzylethanolamine acetate are preferred reductant components. The molar ratios of photodeactivator (oxidant) to leuco dye used range from 0.01:1 to 2:1, preferably 0.2:1 to 1:1. The molar ratios of reductant to leuco dye used range from about 1:1 to about 90:1, preferably 5:1 to 25:1.

(D) Optional Component(s)

Optionally, other additives can be present in the photoimaging composition. Polymeric binders can be added to thicken the formulations or adhere them to substrates. The binders can also serve as a matrix for the color-forming composition. Light-transparent and film-forming polymers are preferred. Examples are ethyl cellulose, polyvinyl alcohol, polyvinyl chloride, polystyrene, polyvinyl acetate, poly-(methyl, propyl or butyl methacrylate), cellulose acetate, cellulose butyrate, cellulose acetate butyrate, cellulose nitrate, chlorinated rubber, copolymers of the above vinyl monomers, etc. The binder can be present in an amount from about 0.5 part to about 200 parts by weight of the leuco dye. Generally 5 to 50 parts by weight are used.

As indicated above, optionally, but preferably, a polymeric binder can be present in the photopolymerizable photoimaging system. Suitable binders include, but are not limited to, the following: the polymerized methylmethacrylate resins including copolymers thereof, polyvinyl acetals such as polyvinyl butyral and polyvinyl formal, vinylidene chloride copolymers (e.g., vinylidene chloride/acrylonitrile, vinylidence chloride/methacrylate and vinylidene chloride/ vinylacetate copolymers), synthetic rubbers (e.g., butadiene/ acrylonitrile copolymers and chloro-2-butadiene-1,3- polymers, cellulose esters (e.g., cellulose acetate, cellulose acetate succinate and cellulose acetate butyrate), polyvinyl esters (e.g., polyvinyl acetate/acrylate, polyvinyl acetate/ methacrylate and polyvinyl acetate), polyvinyl chloride and copolymers (e.g., polyvinyl chloride/acetate), polyurethanes, polystyrene and the polymeric binders described in U.S. Pat. No. 3,418,295. 0.001 to 2.0 parts by weight per 100 parts by weight of monomer and binder of a thermal addition polymerization inhibitor preferably is present.

The photoimageable compositions can also contain inert infusible fillers such as titanium dioxide, organophilic colloidal silica, bentonite, powdered glass, micro-sized alumina and mica in minor, noninterfering amounts. Formulations containing micro-sized silicas, as, for example, the "Syloid" silica gels, sold by W. R. Grace & Co., are particularly useful for providing a "tooth" for pencil or ink receptivity and eliminating blocking tendencies.

With some polymers (binders), it is desirable to add a plasticizer, e.g., solid or liquid, to give flexibility to the film or coating. Suitable plasticizers are disclosed in U.S. Pat. No. 3,658,543, column 10, lines 20 to 73. A preferred liquid plasticizer is Nonylphenoxypoly(ethyleneoxy)-ethanol. A preferred solid plasticizer is N-ethyl-p-toluenesulfonamide. The plasticizers can be used in concentration ranging from 0 to 5:3, preferably 1:5 to 1:2, based on the weight of polymeric binder used.

In preparing the formulation generally inert solvents are employed which are volatile at ordinary pressures. Examples include alcohols and ether alcohols such as methanol, ethanol, 1-propanol, 2-propanol, butanol, and ethylene glycol; esters such as methyl acetate and ethyl acetate; aromatics such as benzene, o-dichlorobenzene and toluene; ketones such as acetone, methyl ethyl ketone and 3-pentanone; aliphatic halocarbons such as methylene chloride, chloroform, 1,1,2-trichloroethane, 1,1,2,2- tetrachloroethane and 1,1,2-trichloroethylene; miscellaneous solvents such as dimethylsulfoxide, pyridine, tetrahydrofuran, dioxane, dicyanocyclobutane and 1-methyl-2-oxo-hexamethyleneimine; and mixtures of these solvents in various proportions as may be required to attain solutions. It is often beneficial to leave a small residue of solvent in the dried composition so that the desired degree of imaging can be obtained upon subsequent irradiation.

Useful optional antiblocking agents present to prevent the coatings from adhering to one another include

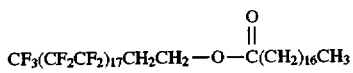

and other known agents.

In the photopolymerizable embodiment of this invention, in addition to the hexaarylbiimidazole compounds described above and/or other photooxidants, at least one addition polymerizable ethylenically unsaturated compound having at least one polymerizable ethylenic group is present. Such compounds are capable of forming a high polymer by free-radical initiated, chain-propagating, addition polymerization. Preferably, the monomeric compound has at least two terminal ethylenically unsaturated groups, e.g., 2 to 4 groups. The monomeric compounds are nongaseous, i.e., at 20° C. and atmospheric pressure, have a normal boiling point about 100° C. and a plasticizing action on any thermoplastic polymeric binder that may be present.

Ethylenically unsaturated monomeric compounds useful in this invention include monomeric compounds or polymers wherein the ethylenic unsaturation is present as an extralinear substituent attached to the polymer backbone. Useful monomeric compounds are: alkylene or a polyalkylene glycol diacrylate prepared from an alkylene glycol or 2 to 15 carbons or a polyalkylene ether glycol of 1 to 10 ether linkages; unsaturated esters of alcohols, preferably polyols and particularly such esters of the alphamethylene carboxylic acids, e.g., ethylene glycol diacrylate, diethylene glycol diacrylate, glycerol diacrylate, glycerol triacrylate, ethylene glycol dimethacrylate, 1,3-propanediol dimethacrylate, 1,2, 4-butanetriol trimethacrylate, 1,4-cyclohexanediol diacrylate, 1,4-benzenediol dimethacrylate, pentaerythritol tetramethacrylate, 1,3-propanediol disacrylate, 1,5- pentanediol dimethacrylate, pentaerythritol triacrylate; the bis-acrylate and methacrylates of polyethylene glycols of molecular weight 200–500, etc; unsaturated amides, particularly those of the alpha-methylene carboxylic acids, and especially those of alpha-omega-diamines and oxygen-interrupted omega-diamines, such as methylene bis-acrylamide, methylene bis-methacrylamide, ethylene bis-metharylamide, 1,6-hexamethylene bis-acrylamide, diethylene triamine trismethacrylamide, bis(gamma-methacrylamidopropoxy) ethane, beta methacrylamidoethyl methacrylate, N-(betahydroxyethyl)-beta-(methacrylamido) ethyl acrylate and N,N-bis(beta-methacryloxyethyl) acrylamide; vinyl esters such as divinyl succinate, divinyl adipate, divinyl phthalate, divinyl terephtalate; divinyl [benzene-1, 4-disulfonate, and divinyl butane-1,4-disulfonate, styrene] and derivatives thereof and unsaturated aldehyde, such as sorbaldehyde (hexadienal).

Useful polymers having ethylenically unsaturated groups attached thereto are: the polymerizable, ethylenically unsaturated polymers of U.S. Pat. No. 3,043,805 and U.S. Pat. No. 2,929,710 e.g., polyvinyl acetate/acrylate, cellulose acetate/acrylate, cellulose, acetate/methacrylate, N-acrylyloxymethyl polyamide, etc.; polyoxyethylated trimethylol propane triacrylate, polytetra-methylene glycol diacrylate, etc., disclosed in U.S. Pat. No. 3,418,295.

Suitable thermal polymerization inhibitors that can be used in photopolymerizable compositions include p-methoxyphenol, hydroquinone, and alkyl- and aryl-substituted hydroquinone, and quinones, tert-butyl catechol, pyrogallol, copper resinate, naphthylamines, beta-naphthol, cuprous chloride, 2,6-di-tert-butyl-p-cresol, phenothiazine, pyridine, nitrobenzene and dinitrobenzene. Other useful inhibitors, include p-toluquinone and chloranil, and thiazine dyes, e.g., Thionine Blue G (C. I. Basic Blue 25), and Toluidine Blue O (C. I. Basic Blue 17). In certain embodiments of the invention containing certain dye photoinitiators, however, no thermal inhibitor is required since these initiators have a dual function and in the dark serve as thermal inhibitors.

Free radical producing, electron donor agents (hydrogen donor) and active methylene compounds that can be present in the photopolymerizable photoimaging composition are described in U.S. Pat. No. 3,479,185, column 2, line 50 to column 3, line 3. The electron donor agent has a reactive atom, usually hydrogen, which is removable and in the presence of the radical, such as a substituted 2,4,5-triparylimidazolyl radical, yields a radical which reacts with the monomeric compound to initiate growth of polymer chains.

Suitable electron donor agents which can be used singly or in combination include aniline, N-methylaniline, N,N-diethylaniline, N,N-diethylcresidine, triethanolamine, ascorbic acid, 2-allylthiourea, sarcosin, N,N-diethylglycine, trihexylamine, diethylcyclohexylamine, N,N,N',N-tetramethylethylenediamine, diethylaminoethanol, ethylaminoethanol, N,N,N',N'-ethylenediaminotetracetic acid, N-methylpyrrolidone, N,N,N',N",N"-pentamethyldiethylene triamine, N,N-diethylxylidene, N,N'-dimethyl-1,4-piperazine, N-β-hydroxyethylpiperidine, N-ethylmorpholine, and related amino compounds. While the tertiary amines and especially the aromatic tertiary amines having at least one $CH_2$ group adjacent to the nitrogen atoms are preferred, a combination of two radical generating agents such as a tertiary amine, e.g., N,N-dimethylaniline, and a secondary amine, e.g., N-phenylglycine, appear especially useful.

In a photoimaging composition containing the hexarylbiimidazole and/or other photooxidant(s), monomeric compound and electron donor agent, the light-sensitivity, speed, or degree of polymerization is dependent on the concentration of the hexaarylbiimidazole and electron donor agent. Useful compositions may be limited in part by the solubilities of the components. It is known in the art that the speed increases up to a certain concentration of hexaphenylbiimidazole and electron donor agent, and an increase of the concentration past that level does not produce any increase in speed and in some instances the speed drops. When a leuco dye is used as the electron donor agent, a mole ratio of leuco dye to the hexaphenylbiimidazole of 1.0 to 1.4 affords the best results as to photospeed and stability.

Solvents, plasticizers, e.g., 10 to 50 percent by weight based on the weight of monomer, antiblocking agents, ultraviolet absorbers can be present in the photopolymerizable photoimaging composition. In addition, oxygen scavengers, e.g., 2-allyl thiourea, dimethylsulfoxide, stannous chloride, N-phenhyglycine, etc., can be present. The oxygen scavenger appears to eliminate or reduce the induction period usually found in a photopolymerization reaction, possibly by consumption of oxygen in the layer prior to exposure.

Another additive that can be present in the photopolymerizable composition is a chain transfer agent in an amount of from 0.01 to 0.1 mol/mol electron donor agent such as a leuco dye, N-phenyglycine, 1,1-dimethyl-3,5-diketocyclohexane, or organic thiols, e.g., 2-mercaptobenzothiazole, 2-mercaptobenzoxazole, 2-mercaptobenzimidazole, pentaerythritol tetrakis (mercaptoacetate), 4-acetamidothiophenol, mercaptosuccinic acid, dodecanethiol, beta-mercapto-ethanol, beta-mercaptoethanol, or other organic thiol.

Still another additive is an energy-transfer dye of the type disclosed in U.S. Pat. No. 3,479,185, column 5, lines 57 to 74. Generally such energy-transfer dyes are present in 0.5 to 3.0% by weight based on the weight of monomer or binder component, if present.

Materials of Construction:

In forming a monochrome or multicolor proofing product according to this invention, the photoimageable compositions are frequently coated onto paper substrates.

Any of the support films known for use as such for a photoimageable coating can be used as a temporary support for coating the photoimageable material onto in the application of the present invention. The temporary support film, which preferably has a high degree of dimensional stability to temperature changes, may be chosen from a wide variety of polyamides, polyolefins, polyesters, vinyl polymers, and cellulose esters, and may have a thickness of from about 6 to 200 microns. A particularly suitable support film is polyethylene terephthalate having a thickness of about 25 microns.

In a photoimageable film it is necessary or at least highly desirable to protect the photosensitive layer by a removable cover film in order to prevent blocking when it is stored in a roll form. The protective cover film is removed prior to lamination of the photoimageable element to a substrate.

The protective cover film may be selected from the same group of high polymer films described for the temporary support film, supra, and may have the same wide range of thicknesses; however, it is preferable to use a cover sheet that is relatively flexible under lamination conditions. A cover sheet of 25 microns thick polyethylene or polypropylene is especially suitable.

Preferred Ranges:

The preferred ranges of components for the photoimageable compositions of this invention are about 0.1 to about 5 parts by weight of component (a), at least one deuterated leuco dye(s) or salt thereof, and about 0.1 to about 30 parts by weight of component (b), a photooxidant(s). A polymeric binder is an optional component in the photoimageable compositions of this invention, and, if present, is preferably present to the extent of about 20 to about 70 parts by weight. Other optional components can be present in amounts that are not limited. All parts by weight are with respect to the weight of the total composition in each case, excluding solvent(s).

In the photopolymerizable embodiments of this invention, an ethylenically unsaturated monomer and/or other photopolymerizable materials are present preferably at levels of about 5 to about 70 parts by weight. All parts by weight are with respect to the weight of the total composition in each case, excluding solvent(s).

Manufacturing Process:

The process of formation of a dry film is relatively simple and direct. The stable liquid photoimageable and/or photopolymerizable composition(s) of the present invention is coated onto a substrate which may be permanent or temporary. Various methods of coating can be employed which are well known in the art.

Substantially all solvent(s) in the liquid composition is removed which results in a dry film. Since a relatively high solids content is present in the liquid, under preferred conditions it is considered that a relatively small amount of liquid has to be removed in forming a dry film.

The stable liquid photoimageable and/or photopolymerizable composition(s) of the present invention can in some embodiments also be used in liquid form in which case the stable liquid referenced in the first paragraph of this section is employed directly in the processes of this invention without conversion to a dry film product.

PROCESS OF USE

The photoimageable and/or photopolymerizable compositions of this invention may be used to prepare monochrome and multicolor proofing products as well as photoresists, soldermasks, printing plates, and other photopolymer products. These compositions are applied to a substrate by coating a liquid dispersion or solution or by laminating a dry film, if a dry film as described above is prepared. After optional drying, if needed and selected, the coating is imagewise exposed to actinic radiation, generally through a process negative or positive transparency after a draw-down time of 30 seconds to 2 minutes. The transparency is an image bearing transparency consisting solely of substantially opaque and substantially transparent areas where the opaque areas are substantially of the same optical density. The compositions used in the process of the invention generally exhibit their maximum sensitivity in the ultraviolet range, therefore the radiation source should furnish an effective amount of this type of radiation. Suitable radiation sources include carbon arcs, mercury-vapor arcs, fluorescent lamps with special ultraviolet-emitting phosphors, argon glow lamps, electronic flash units, and photographic flood lamps. If, however, actinic radiation is utilized that is in a different range than ultraviolet, e.g., visible range or near infrared range, then a corresponding radiation source having high output in either the visible range or near infrared range should be utilized. The radiation exposure time can vary from fractions of a second to minutes depending on the intensity, type of radiation source used and its distance from the photoimageable/photopolymerizable layer and the type of photoimageable/photopolymerizable layer. In general exposure times range from 1 second to 10 minutes or more using standard commercial radiation sources (non-laser). Laser radiation sources can also be employed; in these cases, the exposure times can be much shorter, e.g., milliseconds or less, and with no upper limit.

Following imagewise exposure to form imaged and non-imaged areas in the photoimageable/photopolymerizable composition, and removal of the cover sheet, if present, the exposed layer in some embodiments is optionally developed to form an image on the first substrate. Developing of the exposed layer having imaged and non-imaged areas to form an image on the first substrate can be a dry development step, as in certain proofing applications, or it can be a wet development step, as in other proofing applications and as typical for photoresist, solder mask, and flexographic printing plate applications. In some proofing applications involving photoimageable embodiments, the photoimaging is effected without development and there is no development step.

When development is utilized, the exposed layer may be developed using an aqueous alkaline developer, a semiaqueous developer, or a solvent developer which will remove the non-imaged areas leaving a relief image. If the first substrate is a copper-clad epoxy glass substrate, then the image formed is a resist image which may be used as a mask for etching or plating the copper exposed areas of the first substrate. If the first substrate is a metal substrate, such as anodized aluminum, then a printing plate results. If the first substrate is a paper substrate to be used in a proofing application, then either a monochrome or multicolor proofing image results. The photoimageable layer may also be pigmented resulting in a proofing product after wash-off development.

The exposed layer having imaged and non-imaged areas may also be developed by peel-apart development. In this embodiment the photoimageable layer may be pigmented. A second substrate may be laminated to the photo-imageable layer prior to the exposure step or after formation of the imaged and non-imaged areas in the exposed layer. The second substrate is then peeled off, resulting in the imaged areas remaining on the first substrate and the non-imaged areas being removed on the second substrate. If the photoimageable/photopolymerizable layer is unpigmented, the tacky non-imaged areas that are removed with the second substrate may be treated with dry particulate toners or toning films as described above.

After imagewise exposure, the next and final required step in the process of use of this invention is to fix, preferably by photofixing, the exposed layer having imaged and non-imaged areas. Preferred compositions of this invention contain optional fixing chemical components, such as various quinones, e.g., 9,10-phenanthrenequinone. When such quinones are present in sufficient amount in the photoimageable and/or photopolymerizable compositions of this invention, the compositions are effectively fixed (deactivated toward further changes in optical density) by exposure to visible actinic radiation.

The invention will now be illustrated, but not limited, by the examples.

EXAMPLES

In the following examples, all parts and percentages are by weight and all temperatures are in degrees Centigrade unless otherwise indicated.

DEFINITIONS

Reflectance optical density (D)—This is defined to be 0.00 units on uncoated HG-3 paper base with the measurement of D being made on a calibrated Macbeth RD918 reflection densitometer, with characteristic parameters of visual filter "black" setting and null density mode in use.

$D_{imaged}=D_{max}$—This is the optical density in an imaged area after 40 units of ultraviolet (UV) light (40 units is equal to exposure between 350–400 nm at about 40–50 mJ/cm$^2$) exposure through a Kokomo (UV light pass/visible light cutoff) filter (Kokomo Opulescent Glass Co., Kokomo, Ind.).

$D_{unimaged}$—This is the optical density measured in an unimaged (unexposed) area.

$D_{fixed}$—This is the optical density measured in a non-imaged area after 700 units of visible light (700 units is equal to exposure between 400–500 nm at about 1200–1500 mJ/cm$^2$) exposure through a Clearing Film (CF) having characteristics of being a UV light cutoff/visible light pass filter made of a transparent film with a UV cutoff wavelength=~400 nm.

$D_{forced}$—This is the optical density measured in a non-imaged area after 700 units of visible light (700 units is equal to exposure between 400–500 nm at about 1200–1500 mJ/cm$^2$) exposure through a Clearing Film (CF), having the characteristics given above, followed by 40 units of UV exposure through a Kokomo filter (UV light pass/visible light cutoff filter).

GLOSSARY

HEXAARYLBIIMIDAZOLES (HABIs)
  CDM-HABI—2-(o-chlorophenyl)-4,5-bis(m-methoxyphenyl)-imidazole dimer
  o-Cl-HABI—2,2'-bis(o-chlorophenyl)-4,4',5,5'-tetraphenyl-1,1'-biimidazole (CAS No. 1707-68-2)
  TCDM-HABI—"trichlorodimethoxy-hexaarylbiimidazole"=2,2'5-tris(2-chlorophenyl)-4-(3, 4-dimethoxyphenyl)-4,5-diphenylbiimidazole (and isomers). [Note that this compound, in contrast to some other HABI's, is an unsymmetrical compound, being the adduct of two different imidazoles.]
  2,3,5-TCI-HABI—2,2'-bis(2,3,5-trichlorophenyl)-4,4',5, 5'-tetraphenyl-1,1'-biimidazole or 1,1'-Bi-H-imidazole, 4,4',5,5'-tetra phenyl-2,2'-bis(2,3,5-trichlorophenyl)- (CA Index Name, CAS No. 154482-21-0)
  TCTM-HABI—1H-imidazole, 2,5-bis(o-chloro-phenyl)-4-[3,4-dimethoxyphenyl]-, dimer or 2,2',4,4'-Tetrakis (o-chlorophenyl)-5,5'-bis(m,p-dimethoxyphenyl) bisimidazole.

LEUCO DYES
  LCV—Leuco crystal violet, the formal chemical name is tris(N,N-dimethylaminophenyl)methane or tris(N,N-dimethylaminophenyl)-1-hydridomethane. Oxidation of LCV under suitable conditions converts the colorless (or nearly colorless) leuco form to the colored dye form.
  D-LCV—Deuterated Leuco crystal violet; the formal chemical name is tris(N,N-dimethylaminophenyl)-1-deuteromethane. Oxidation of D-LCV under suitable conditions converts the colorless (or nearly colorless) leuco form to the colored dye form.
  LECV—Leuco ethyl crystal violet ; the formal chemical name is tris(N,N-diethylaminophenyl)methane or tris (N,N-diethylaminophenyl)-1-hydridomethane. Oxidation of LECV under suitable conditions converts the colorless (or nearly colorless) leuco form to the colored dye form.
  D-LECV—Deuterated leuco ethyl crystal violet dye, the formal chemical name is tris(N,N-diethylaminophenyl)-1-deuteromethane. Oxidation of LECV under suitable conditions converts the colorless (or nearly colorless) leuco form to the colored dye form.
  LV-1—Bis(4-N,N-diethylaminophenyl)(2-methyl-4-N,N-diethylaminophenyl)methane.
  D-LV-1—Bis(4-N,N-diethylaminophenyl)(2-methyl-4-N, N-diethylaminophenyl)-1-deuteromethane.
  LV-2—(4-N,N-Diethylaminophenyl)bis(2-methyl-4-N, N-diethylaminophenyl)methane.
  D-LV-2—(4-N,N-Diethylaminophenyl)bis(2-methyl-4-N,N-diethylaminophenyl)-1-deuteromethane.
  LV-3—Tris(2-methyl-4-N,N-diethylaminophenyl) methane.
  D-LV-3—Tris(2-methyl-4-N,N-diethylaminophenyl)-1-deuteromethane.

OTHER COMPONENTS
  CAB-381-20—Cellulose acetate butyrate, 20 sec viscosity, Mn=70,000 daltons, with Tg=141° C. It is a white powder with 37% butyryl content, 13% acetyl content, and 2% hydroxyl content by weight—Eastman Chemical Products, Inc., P.O. Box 431, Kingsport, Tenn. 37662-5280.
  CAB-381-0.5—Cellulose acetate butyrate, 0.5 sec viscosity, Mn=30,000 daltons, with Tg=130° C. It is a white powder with 37% butyryl content, 13% acetyl content, and 1.5% hydroxyl content by weight—Eastman Chemical Products, Inc., P.O. Box 431, Kingsport, Tenn. 37662-5280.
  DDBSA—Dodecylbenzenesulfonic acid, CAS Registry No. 68584-22-5, contains C10–C16 alkyl derivatives—DuPont, Wilmington, Del.
  Merpol®—A proprietary aromatic glycol ether mixture, which is an
  OPP 2660 odorless, clear, yellow liquid; DuPont, 1007 Market St., Wilmington, Del. 19898.
  Syloid®63—Synthetic amorphous silica (also known as amorphous silicon dioxide or silica gel). It is an odorless, dry, white powder with a median particle size of 9 microns. W. R. Grace & Co., P. O. Box 2117, Baltimore, Md. 21203.
  Syloid®620—Synthetic amorphous silica (also known as amorphous silicon dioxide or silica gel). It is an odorless, dry, white powder with a median particle size of 12 microns. W. R. Grace & Co., P. O. Box 2117, Baltimore, Md. 21203.

Example 1

D-LECV was synthesized by sodium borodeuteride reduction of commercial ethyl crystal violet (ECV, obtained from Aldrich Chemical Co., Milwaukee, Wis.). Ethyl crystal violet (10 g) was dissolved in 120 ml of N,N-dimethylformamide (DMF). Sodium borodeuteride (1 g) was dissolved in 20 ml of DMF, and this solution was slowly added to the ethyl violet/DMF solution. A small amount of gassing was noted; the color was discharged at about the half way addition point. After addition of the NaBD4/DMF solution was complete, the resulting mixture was stirred for 2 hours, and then 50 ml of acetone was added. After standing overnight, the resulting reaction mixture was added to water and extracted with methylene chloride. The methylene chloride extract was washed twice with water, methylene chloride was removed in vacuo to a point where the extract mixture was about 25% of the original volume, ethanol was added, and solvent was removed in vacuo until the extract mixture was again about 25% of the original volume. The resulting mixture was filtered and dried to afford 6 g of a solid with no coloring. NMR analysis of this solid indicated that the extent of deuteration was >90%.

Alternatively, D-LECV may be prepared from ethyl crystal violet (ECV, ethyl violet) and lithium aluminum hydride following the published synthesis for deuterated compounds of this type as given in the literature [Lewis, E. S. et al., *J. Amer. Chem. Soc.*, 1070, 92, 899–905, see page 903 in particular].

As another alternative, D-LECV can be synthesized starting with LECV. The LECV is oxidized to ECV using as oxidant chloranil/air/CuSO4 and bis(ethylenediamine). The ECV dye is then reduced to D-LECV using either sodium borodeuteride or lithium aluminum deuteride as given above.

Example 2

This example illustrates the advantageous use of a deuterated aminotriaryl-methane component in a photoimageable composition in place of the corresponding aminotriarylmethane (undeuterated) component. More specifically, this example illustrates that use of a deuterated aminotriarylmethane component in place of the undeuterated component affords a significantly lower $D_{unimaged}$ value while maintaining a suitably high $D_{imaged}$ value. In addition the $D_{fixed}$ and $D_{forced}$ values are acceptable.

Three batches containing the following materials were made:

| Ingredient Name | Amount (g) |
| --- | --- |
| Acetone | 72.0160 |
| 2-Propanol | 7.9840 |
| Dodecylbenzenesulfonic acid (DDBSA) | 0.1200 |
| TCTM-HABI | 0.3295 |
| Syloid ® 63 | 0.5685 |
| Syloid ® 620 | 0.1082 |
| Merpol ® OPP 2660 | 2.3567 |
| N-ethyl-para-toluenesulfonamide (Santicizer ® 3) | 2.6410 |
| Triethanolamine triacetate | 1.8158 |
| 9,10-Phenanthrenequinone | 0.1020 |
| CAB-381-20 (Cellulose acetate butyrate, 20 sec viscosity) | 8.1202 |
| CAB-381-0.5 (Cellulose acetate butyrate, 0.5 sec viscosity) | 4.0601 |

To these identical solutions the following equimolar amounts of leuco dyes were added as shown:

| Sample # | Leuco Dye | Amt. (g) |
| --- | --- | --- |
| 1 | Tris(N,N-diethylaminophenyl)methane [Leuco ethyl crystal violet, LECV] | 0.167 |
| 2 | Bis(4-N,N-diethylaminophenyl)(2-methyl-4-N,N-diethylaminophenyl)methane | 0.172 |
| 3 | Tris(N,N-diethylaminophenyl)-1-deuteriomethane (Deuterated leuco ethyl crystal violet, D-LECV) | 0.167 |

All three batches were coated at a weight of 98.5–103.5 mg/sq. dm on HG-3 paper and dried in safelight. After exposure (see definitions) and accelerated aging 24 hours at 58° C.±2° C.; 30–35% relative humidity±5%), the following observations were made:

| Sample # | Color[a] | $D_{imaged}$[a] | $D_{unimaged}$[a] | $D_{unimaged}$[b] | $D_{fixed}$[a] | $D_{forced}$[a] |
| --- | --- | --- | --- | --- | --- | --- |
| 1 | purple | 0.82 | 0.08 | 0.27 | 0.12 | 0.12 |
| 2 | blue | 0.63 | 0.02 | 0.09 | 0.05 | 0.05 |
| 3 | purple | 0.75 | 0.01 | 0.08 | 0.05 | 0.05 |

[a]Determined using a fresh sample at ambient conditions (i.e., ~22° C. +− 2° C. and 32 +− 5% relative humidity)
[b]Determined on a sample aged 24 hours at 58° C. and 32% relative humidity (RH)

As is illustrated above, Sample #3, containing D-LECV, in relation to Sample #1, containing LECV, exhibited significantly lower (improved) $D_{unimaged}$ values, both for aging under ambient conditions for 24 days and for accelerated aging (24 hours at 58° C. and 32% RH) at an elevated temperature (58° C.). In addition, Sample #3 with D-LECV afforded an acceptably high $D_{imaged}$ value that was only slightly lower than that for Sample #1 with LECV. Furthermore, both Samples #1 and #3 were characterized to have the same color—purple. $D_{forced}$ and $D_{fixed}$ values were also acceptably low for Sample #3. The fact that the $D_{forced}$ and $D_{fixed}$ values were comparable and in fact identical for Samples #2 and #3 indicates that photodeactivation efficiencies are good (high) for both samples.

Also as is illustrated above, Sample #3, containing D-LECV, exhibited a significantly higher (improved) $D_{imaged}$ value to Sample #2, containing LV-1, while it exhibited comparable $D_{unimaged}$ values to Sample #2, containing LV-1. Furthermore, Sample #3, containing D-LECV, in relation to Sample #2, containing LV-1, did not exhibit a change of color from that of Sample #1, containing LECV. Thus this example illustrates that a D-LECV-containing sample not only has improved thermal stability over a comparable LECV-containing sample (based on comparison of $D_{unimaged}$ values), but that it also has stability comparable to that of a LV-1-containing sample. It is important to understand that the good stability of an LV-1-containing sample was achieved at a price: not only was it necessary to add an ortho-methyl group to one of the rings, but the presence of that group irrevocably and undesirably shifts the color of the resultant leuco dye away from (i.e., toward the green of) the color of Ethyl Violet, resulting in a "royal" blue color. Thus, though more stable, an LV-1-containing sample cannot match the color of a LECV-containing sample. But, in sharp contrast, a comparable D-LECV-containing sample can do both.

Example 3

D-LV-1 leuco dye was prepared from the corresponding undeuterated colored dye (in non-leuco form). This latter component is designated the V-1 dye. The V-1 dye was obtained from Hilton Davis (a part of Freedom Chemical Co.), Cincinnati, Ohio. The chemical name of the V-1 dye is bis(4-diethylaminophenyl) (2-methyl-4-diethylaminophenyl)carbocation chloride salt.

The following components and amounts were charged to a reaction vessel: N,N-dimethylformamide (1500 g) and V-1 dye (78 g), which afforded a deep blue solution (solution A). A mixture of lithium aluminum deuteride (3 g) in N,N-dimethylformamide (100 g) (LAD/DMF mixture) was added dropwise to solution A over a period of 2 hours. During this addition, the temperature rose from ambient to 34° C., considerable foaming was observed during addition of the first 10 ml of the LAD/DMF mixture, and the blue color of solution A was slowly discharged to a light green color. After the 2 hour addition was complete, 200 ml of acetone was added to react away any excess LAD. The reaction mixture was then added to 5 liters of water, and the resulting mixture was extracted with 300 ml of methylene chloride. The methylene chloride was partially removed in vacuo to the extent that the mixture was ~30% of the original volume, and the residue was taken up in ethanol (300 ml). The resulting mixture was further stripped of solvent in vacuo until the mixture was about 30% of the original volume. The mixture was filtered and then dried to yield 57 g of D-LV-1 as a grey powder.

NMR analysis of the D-LV-1 indicated that the extent of deuteration was >92%.

Example 4

This example illustrates the advantageous use of D-LV-1 component in a photoimageable composition in place of the corresponding undeuterated LV-1 component. Specifically, this example illustrates that use of a D-LV-1, in place of the corresponding undeuterated compound, LV-1, affords a significantly lower $D_{unimaged}$ value while maintaining a suitably high $D_{imaged}$ value. In addition the $D_{fixed}$ and $D_{forced}$ values are acceptable.

The same test samples and procedures are followed as in Example 2, except that LV-1 and D-LV-1 leuco dyes are substituted in place of LECV and D-LECV. The details of this example are given below.

To the identical solutions having the compositions listed in Example 2, the following equimolar amounts of leuco dyes are added as shown:

| Sample # | Leuco Dye | Amt. (g) |
|---|---|---|
| 1 | LV-1 | 0.167 |
| 2 | D-LV-1 | 0.167 |

Both batches are coated at a weight of 98.5–103.5 mg/sq. dm on HG-3 paper and are dried in safelight. After exposure (see definitions) and accelerated aging (24 hours at 58° C. and 32% relative humidity), the following observations are made:

| Sample # | Color[a] | $D_{imaged}$[a] | $D_{unimaged}$[a] | $D_{unimaged}$[b] | $D_{fixed}$[a] | $D_{forced}$[a] |
|---|---|---|---|---|---|---|
| 1 | purple | 0.83 | 0.07 | 0.25 | 0.12 | 0.12 |
| 2 | purple | 0.78 | 0.01 | 0.09 | 0.06 | 0.05 |

[a]Determined using a fresh sample at ambient conditions (i.e., ~22° C. +− 2° C. and 32 +− 5% relative humidity)
[b]Determined on a sample aged 24 hours at 58° C. and 32% relative humidity (RH)

As is illustrated above, Sample #2, containing D-LV-1, in relation to Sample #1, containing LV-1, exhibits significantly lower (improved) $D_{unimaged}$ values, both for aging under ambient conditions for 24 days and for accelerated aging (24 hours at 58° C. and 32% RH) at an elevated temperature (58° C.). In addition, Sample #2 with D-LV-1 affords an acceptably high $D_{imaged}$ value that was only slightly lower than that for Sample #1 with LV-1.

Furthermore, both Samples #1 and #2 are characterized to have the same color—purple. $D_{forced}$ and $D_{fixed}$ values are also acceptably low. The fact that the $D_{forced}$ and $D_{fixed}$ values are comparable and in fact identical for Samples #1 and #2 indicates that photodeactivation efficiencies are good (high) for both samples.

Example 5

This example illustrates the advantageous use of a deuterated aminoxanthene component in a photoimageable composition in place of the corresponding undeuterated aminoxanthene component. In case of this particular aminoxanthene, the molecular structure contains only one amino group bonded to one of the three aromatic aryl moieties. More specifically, the aminoxanthene in this example is LM-5. The LM-5 compound has the structure shown in Table 2 for compound 3, i.e., LM-5=compound no. 3 in Table 2. Furthermore, this example illustrates that use of a deuterated aminoxanthene, containing only a single amino group, in place of the corresponding undeuterated compound affords a significantly lower $D_{unimaged}$ value while maintaining a suitably high $D_{imaged}$ value. In addition the $D_{fixed}$ and $D_{forced}$ values are acceptable. This compound (LM-5) can be obtained from Hodogaya Chemical Co., Ltd., Japan. D-LM-5 can be obtained with ≧80% deuteration using the aforementioned oxidation/reduction sequence starting with LM-5.

The same test samples and procedures are followed as in Example 2, except that LM-5 and D-LM-5 leuco dyes are substituted in place of LECV and D-LECV. The details of this example are given below.

To the identical solutions having the compositions listed in Example 2, the following equimolar amounts of leuco dyes are added as shown:

| Sample # | Leuco Dye | Amt. (g) |
|---|---|---|
| 1 | LM-5 | 0.167 |
| 2 | D-LM-5 | 0.167 |

Both batches are coated at a weight of 98.5–103.5 mg/sq. dm on HG-3 paper and are dried in safelight. After exposure (see definitions) and accelerated aging (24 hours at 58° C. and 32% relative humidity), the following observations are made:

| Sample # | Color[a] | $D_{imaged}$[a] | $D_{unimaged}$[a] | $D_{unimaged}$[b] | $D_{fixed}$[a] | $D_{forced}$[a] |
|---|---|---|---|---|---|---|
| 1 | magenta | 0.82 | 0.08 | 0.27 | 0.12 | 0.12 |
| 2 | magenta | 0.77 | 0.01 | 0.08 | 0.05 | 0.05 |

[a]Determined using a fresh sample at ambient conditions (i.e., ~22° C. +− 2° C. and 32 +− 5% relative humidity)
[b]Determined on a sample aged 24 hours at 58° C. and 32% relative humidity (RH)

As is illustrated above, Sample #2, containing D-LM-5, in relation to Sample #1, containing LM-5, exhibits significantly lower (improved) $D_{unimaged}$ values, both for aging under ambient conditions for 24 days and for accelerated aging (24 hours at 58° C. and 32% RH) at an elevated temperature (58° C.). In addition, Sample #2 with D-LM-5 affords an acceptably high $D_{imaged}$ value that was only slightly lower than that for Sample #1 with LM-5.

Furthermore, both Samples #1 and #2 are characterized to have the same color—purple. $D_{forced}$ and $D_{fixed}$ values are also acceptably low. The fact that the $D_{forced}$ and $D_{fixed}$ values are comparable and in fact identical for Samples #1 and #2 indicates that photodeactivation efficiencies are good (high) for both samples.

Compounds within the generic scope of the invention are shown in Table 1. Intermediates utilized to produce the deuterated version herein are shown in Table 2. The present invention also relates to a method of using a non-deuterated version of formula I and formulas II–VI (I'–VI' wherein all the variables are identical) as an intermediate to produce the corresponding deuterated versions wherein said compounds are utilized in photoactivatable compositions.

FORMULA

I
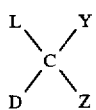

II
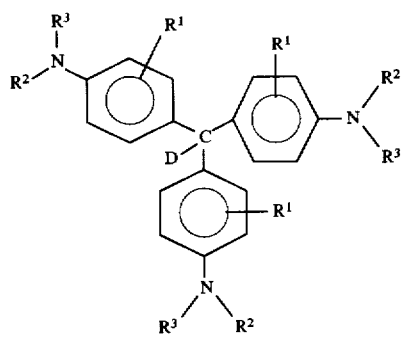

III
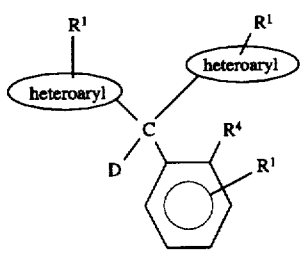

-continued
FORMULA

IV
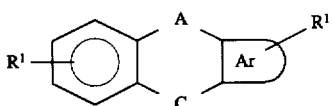

V
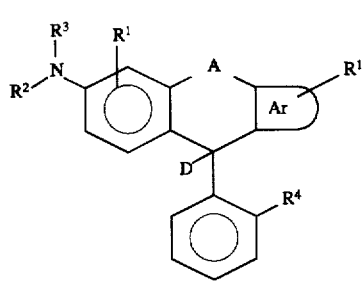

VI
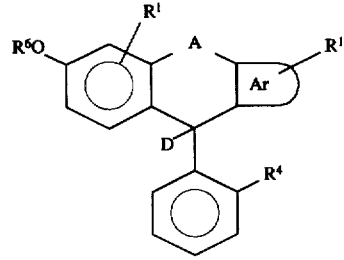

TABLE 1

$$\begin{array}{c} L \diagdown \diagup Y \\ C \\ D \diagup \diagdown Z \end{array} \quad I$$

| L | Y | Z | R[1] | R[2] or R[3] | R[4] | n |
|---|---|---|---|---|---|---|
| phenyl-R[1] | phenyl-R[1] | phenyl with R[4] and R[1] or | is a single or multiple substituent and is selected from —NR[2]R[3], —(CH$_2$)$_n$C(O)O(C1–C6 alkyl), Cl, Br, F or I, —(CH$_2$)$_n$O(C1–C6 alkyl), —OH, —(C1–C6 alkyl) | H, C1–C6 alkyl, C1–C6 alkylaryl, aryl, C4-C7 cycloalkyl, —(CH$_2$)$_n$O—(C1–C6 alkyl) | —C(O)O—C1–C6 alkyl) —OH —C1–C6 alkyl | 0–6 |
| naphthyl-R[1], or | naphthyl-R[1], or | naphthyl with R[4] and R[1] | | | | |
| heteroaryl-R[1] which is a 9–11 membered bicyclic heteroaryl moiety having 1–3 hetero- | heteroaryl-R[1] which is a 9–11 membered bicyclic heteroaryl ring having 1–3 hetero- | | | | | |

TABLE 1-continued $$\begin{array}{c} L \diagdown \quad \diagup Y \\ C \\ D \diagup \quad \diagdown Z \end{array} \quad I$$

| L | Y | Z | R¹ | R² or R³ | R⁴ | n |
|---|---|---|----|----------|-----|---|
| atoms selected from NR², S or O wherein either aryl or heteroaryl may be unsubstituted or substituted with R¹ | atoms selected from NR², S or O wherein either aryl or heteroaryl may be unsubstituted or substituted with R¹ | | | | | | and wherein at least two of groups L, Y and Z may, through the central methine carbon atom of forumla I, bridge to form at least one additional 5–8 membered ring having at least one heteroatom (A) chosen from NR², O or S

TABLE 2

| Compound No. | Structure |
|---|---|
| 1 | |
| 2 | |
| 3 | |
| 4 | |

TABLE 2-continued

| Compound No. | Structure |
| --- | --- |
| 5 | (structure) |
| 6 | (structure) |
| 7 | (structure) |
| 8 | (structure) |
| 9 | (structure) |
| 10 | (structure) |

TABLE 2-continued

| Compound No. | Structure |
|---|---|
| 11 | [structure] |
| 12 | [structure] |
| 13 | [structure] |
| 14 | [structure] |
| 15 | [structure] |

What is claimed is:

1. A photoimageable composition comprising:
   (a) a deuterated leuco dye or salt thereof, and
   (b) a photooxidant.

2. The composition according to claim 1, wherein the leuco dye is selected from the group consisting of (a) deuterated aminotriarylmethanes, (b) deuterated aminoxanthenes, (c) deuterated aminothioxanthenes, (d) deuterated amino-9,10-dihydroacridines, (e) deuterated aminophenoxazines, (f) deuterated aminophenothiazines, (g) deuterated aminodihydrophenazines, (h) deuterated aminodiphenylmethanes, (i) deuterated leuco indamines, (h) deuterated aminohydrocinnamic acids, (k) deuterated hydrazines, (l) deuterated leuco indigoid dyes, (m) deuterated amino-2,3-dihydroanthraquinones, (n) deuterated tetrahalo-p,p'-biphenols, (o) deuterated 2(p-hydroxyphenyl)-4,5-diphenylimidazoles, and (p) deuterated phenethylanilines, and wherein the photooxidant is selected from the group consisting of (a) a hexaarylbiimidazole compound (HABI), (b) a halogenated compound having a bond dissociation energy to produce a first halogen as a free radical of not less than about 40 kilogram calories per mole, and having not more than one hydrogen attached thereto, (c) a sulfonyl halide, R-SO2-X wherein R is a member of the group consisting of alkyl, alkenyl, cycloalkyl, aryl, alkaryl, or aralkyl and X is chlorine or bromine, (d) a sulfenyl halide of the formula R'-S-X' wherein R' and X' have the same meaning as R and X in RSO2X above, (e) a tetraaryl hydrazine, (f) a benzothiazolyl disulfide, (g) a polymethacrylaldehyde, and (h) an alkylidene 2,5-cyclohexadien-1-one.

3. A composition according to claim 2, wherein the deuterated leuco dye or salt thereof is selected from a compound of the formula:

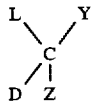
I wherein
D is deutero;
L is an aryl moiety

selected from phenyl or naphthyl or a 9–11 membered heteroaryl moiety

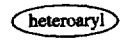

having 1–3 hetetoatoms selected from $NR^2$, S or O wherein the aryl or heteroaryl ring may be unsubstituted or substituted with $R^1$ which is selected from $—NR^2R^3$, $—(CH_2)_nC(O)O(C_1–C6\ alkyl)$, $—X$, $—(CH_2)_nO(C1–C6\ alkyl)$, $—OH$, $—(C1–C6\ alkyl)$;

Y is an aryl moiety

selected from the phenyl or naphthyl or a 9–11 membered bicyclic heteroaryl moiety

having 1–3 heteroatoms selected from $NR^2$, S or O wherein the aryl or heteroaryl ring may be unsubstituted or substituted with $—NR^2R^3$, $—(CH_2)_nC(O)O(C1–C6\ alkyl)$, $—X$, $—(CH_2)_n(C1–C6\ alkyl)$, $—OH$, $—(C1–C6\ alkyl)$;

Z is an aryl moiety

selected from phenyl or naphthyl wherein the aryl ring may be unsubstituted or substituted with $—NR^2R^3$, $—(CH_2)_nC(O)(C1–C6\ alkyl)$, $—X$, $—(CH_2)_nO(C1–C6\ alkyl)$, $—OH$, $—(C1–C6\ alkyl)$;

$R^2$ or $R^3$ are independently selected from H, C1–C6 alkyl, C1–C6 alkylaryl, aryl, C4–C7 cycloalkyl, $—(CH_2)_nO(C1–C6\ alkyl)$;

X is selected from Cl, Br, F or I; and n is 0–6, wherein at least two or more groups L, Y and Z may, through the central, methine carbon atom of formula I, bridge to form at least one additional 5–8 membered ring, having at least one heteroatom (A) chosen from $NR^2$, O or S.

4. A composition according to claim 3, wherein L or Y are independently selected from a group of formula

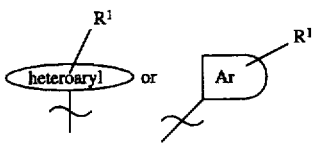

Z is selected from a group of the formula

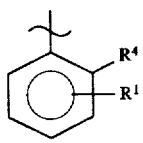

wherein
$R^1$ is selected from $—NR^2R^3$, $—(CH_2)_nC(O)O(C1–C6\ alkyl)$, $—X$, $—(CH_2)_nO(C1–C6\ alkyl)$, $—OH$, $—(C1–C6\ alkyl)$;

$R^2$ or $R^3$ are independently selected from H, C1–C6 alkyl, C1–C6 alkylaryl, aryl, C4–C7 cycloalkyl, $(CH_2)_nO$ (C1–C6 alkyl) wherein the aryl groups may be unsubstituted or substituted with substituents selected from the group consisting of X, $—OH$, $OCH_3$ and $CF_3$;

$R^4$ is selected from $—C(O)O(C1–C6\ alkyl)$, OH, or C1–C6 alkyl.

5. A composition according to claim 4 wherein the deuterated leuco dye or salt thereof is selected from a compound of formula II, III or IV

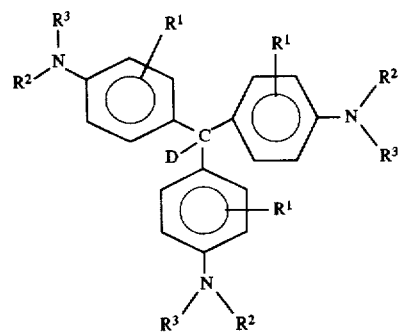
II

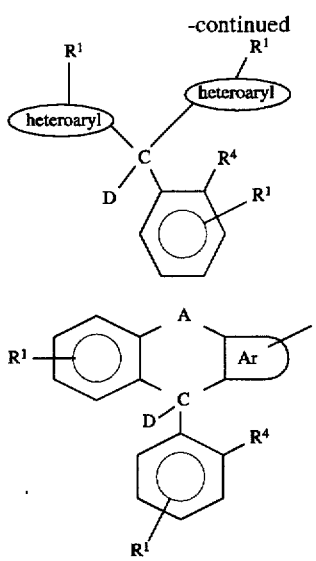

wherein

R¹ is selected from —NR²R³, —C(O)OC1—C6 alkyl, Cl, Br, F, I C1–C6 alkyl, —OH, —OC1–C6 alkyl; and R² or R³ are independently selected from H, C1–C6 alkyl, C1–C6 alkylphenyl, chlorophenyl, cyclohexyl, phenyl, alkyl-O-alkyl wherein each alkyl is C1–C6;

R⁴ is selected from C(O)O(C1–C6 alkyl) and C1–C5 alkyl and A is oxygen.

6. A composition according to claim 5, wherein the deuterated leuco dyes are selected from the group consisting of tris(N,N-dimethylaminophenyl)-1-deuteromethane, tris(N,N-diethylaminophenyl)-1-deuteromethane, bis(4-N,N-diethylaminophenyl)(2-methyl-4-N,N-diethylaminophenyl)-1-deuteromethane, (4-N,N-Diethylaminophenyl)bis(2-methyl4-N,N-diethylaminophenyl)-1-deuteromethane, tris (2-methyl-4-N,N-diethylaminophenyl)-1-deuteromethane, and 2-[9-(diethylamino)-12H-benzo[a]xanthen-12-yl] benzoic acid methyl ester.

7. A composition according to claim 1, wherein the photooxidant is selected from a hexarylbiimidazole compound.

8. A composition according to claim 7 wherein the deuterated leuco dyes are selected from the group consisting of tris(N,N-diethylaminophenyl)-1-deuteromethane, bis(4-N, N-diethylaminophenyl)(2-methyl-4-N,N-diethylaminophenyl)-1-deuteromethane, (4-N,N-Diethylaminophenyl)bis(2-methyl-4-N,N-diethylaminophenyl)-1-deuteromethane, tris(2-methyl-4-N, N-diethylaminophenyl)-1-deuteromethane, and 2-[9-(diethylamino)-12H-benzo[a]xanthen-12-yl]benzoic acid methyl ester, and the hexaarylimidazole compound is selected from the group consisting of 2,2'-bis(o-chlorophenyl)4,4',5,5'-tetraphenyl-1,1'-biimidazole, 2,2',4, 4'-tetrakis(o-chlorophenyl)-5,5'-bis(m,p-dimethoxyphenyl) bisimidazole, 2-(o-chlorophenyl)-4,5-bis(m-methoxyphenyl)-imidazole dimer, and 2,2'-bis(2,3,5-trichlorophenyl)-4,4',5,5'-tetraphenyl-1,1'-biimidazole.

9. The composition according to claim 1 wherein the deuterated leuco dye is present in at least 0.1% by weight of the total composition, and the photooxidant is present in at least 0.1% of the total composition.

10. The composition according to claim 1 which further comprises a binder polymer and a photodeactivation compound.

11. The composition according to claim 1 wherein the composition, containing at least 0.1 weight percent of the leuco dye, upon imagewise exposure to actinic radiation to form imaged and non-imaged areas in the composition, affords imaged areas having an optical density of at least 0.2.

12. A photoimageable element comprising:

(a) a support; and (b) a photoimageable composition according to claims 1, 2, 3, 4, 5, 6 or 7.

13. A photoimageable element according to claim 12 wherein the extent of deuteration of the deuterated leuco dye relative to a hydride version thereof is at least 60%.

14. A process for preparing an image on a substrate comprising, in order:

(i) applying a photoimageable composition on a first substrate, wherein the photoimageable composition comprises:

(a) a deuterated leuco dye or salt thereof; and (b) a photooxidant;

(ii) drying the coated photoimageable composition to form a photoimageable layer on a first substrate;

(iii) imagewise exposing the layer to form imaged and non-imaged areas; and (iv) fixing the exposed layer having imaged and non-imaged areas to form an image on the first substrate.

15. The process according to claim 14, wherein the leuco dye is selected from the group consisting of (a) deuterated aminotriarylmethanes, (b) deuterated aminoxanthenes, (c) deuterated aminothioxanthenes, (d) deuterated amino-9,10-dihydroacridines, (e) deuterated aminophenoxazines, (f) deuterated aminophenothiazines, (g) deuterated aminodihydrophenazines, (h) deuterated aminodiphenylmethanes, (i) deuterated leuco indamines, (j) deuterated aminohydrocinnamic acids, (k) deuterated hydrazines, (l) deuterated leuco indigoid dyes, (m) deuterated amino-2,3-dihydroanthraquinones, (n) deuterated tetrahalo-p,p'-biphenols, (o) deuterated 2(p-hydroxyphenyl)-4,5-diphenylimidazoles, and (p) deuterated phenethylanilines, and wherein the photooxidant is selected from the group consisting of (a) a hexaarylbiimidazole compound (HABI), (b) a halogenated compound having a bond dissociation energy to produce a first halogen as a free radical of not less than about 40 kilogram calories per mole, and having not more than one hydrogen attached thereto, (c) a sulfonyl halide, R-SO2-X wherein R is a member of the group consisting of alkyl, alkenyl, cycloalkyl, aryl, alkaryl, or aralkyl and X is chlorine or bromine, (d) a sulfenyl halide of the formula R'-S-X' wherein R' and X' have the same meaning as R and X in RSO2X above, (e) a tetraaryl hydrazine, (f) a benzothiazolyl disulfide, (g) a polymethacrylaldehyde, and (h) an alkylidene 2,5-cyclohexadien-1-one.

16. A process according to claim 15, wherein the deuterated leuco dye or salt thereof is selected from a compound of the formula:

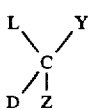

I wherein

D is deutero;

L is an aryl moiety

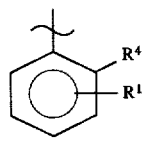

selected from phenyl or naphthyl or a 9–11 membered heteroaryl moiety (heteroaryl)

having 1–3 hetetoatoms selected from $NR^2$, S or O wherein the aryl or heteroaryl ring may be unsubstituted or substituted with $R^1$ which is selected from —$NR^2R^3$, —$(CH_2)_nC(O)O(C1–C6\ alkyl)$, —X, —$(CH_2)_nO(C1–C6\ alkyl)$, —OH, —(C1–C6 alkyl);

Y is an aryl moiety (Ar)

selected from the phenyl or naphthyl or a 9–11 membered bicyclic heteroaryl moiety (heteroaryl)

having 1–3 heteroatoms selected from $NR^2$, S or O wherein the aryl or heteroaryl ring may be unsubstituted or substituted with —$NR^2R^3$, —$(C14_2)_nC(O)O(C1–C6\ alkyl)$, —X, —$(CH_2)_n(C1–C6\ alkyl)$, —OH, —(C1–C6 alkyl);

Z is an aryl moiety (Ar)

selected from phenyl or naphthyl wherein the aryl ring may be unsubstituted or substituted with —$NR^2R^3$, —$(CH_2)_nC(O)(C1–C6\ alkyl)$, —X, —$(CH_2)_nO(C1–C6\ alkyl)$, —OH, —(C1–C6 alkyl);

$R^2$ or $R^3$ are independently selected from H, C1–C6 alkyl, C1–C6 alkylaryl, aryl, C4–C7 cycloalkyl, —$(CH_2)_nO$ (C1–C6 alkyl);

X is selected from Cl, Br, F or I; and n is 0–6, wherein at least two or more groups L, Y and Z may, through the central methine carbon atom of formula 1, bridge to form at least one additional 5–8 membered ring, having at least one heteroatom (A) chosen from $NR_2$, O or S.

17. A process according to claim 16, wherein L or Y are independently selected from a group of formula

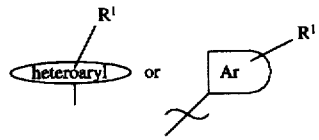

Z is selected from a group of the formula

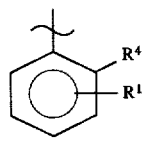

wherein $R^1$ is selected from —$NR^2R^3$, —$(CH_2)_nC(O)O(C1–C6\ alkyl)$, —X, —$(CH_2)_nO(C1–C6\ alkyl)$, —OH, —(C1–C6 alkyl);

$R^2$ or $R^3$ are independently selected from H, C1–C6 alkyl, C1–C6 alkylaryl aryl, C4–C7 cycloalkyl, $(CH_2)_nO$ (C1–C6 alkyl) wherein the aryl groups may be unsubstituted or substituted with substituents selected from the group consisting of X, —OH, $OCH_3$ and $CF_3$;

$R^4$ is selected from —$C(O)O(C1–C6\ alkyl)$, OH, or C1–C6 alkyl.

18. A process according to claim 17 wherein the deuterated leuco dye or salt thereof is selected from a compound of formula II, III or IV

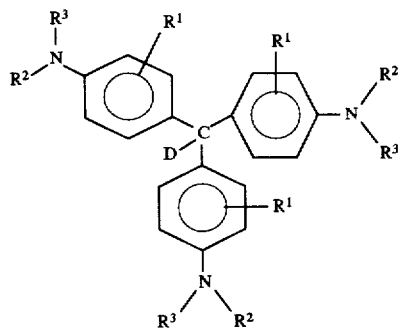

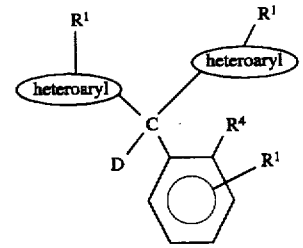

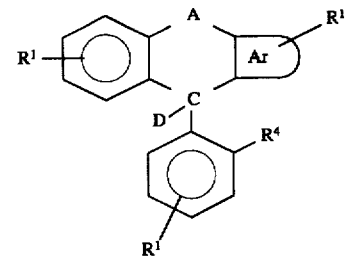

wherein $R^1$ is selected from —$NR^2R^3$, —C(O)OC1–C6 alkyl Cl, Br, F, I C1–C6 alkyl, —OH, —OC1–C6 alkyl; and $R^2$ or $R^3$ are independently selected from H, C1–C6 alkyl, C1–C6 alkylphenyl, chlorophenyl, cyclohexyl, phenyl, alkyl-O-alkyl wherein each alkyl is C1–C6;

$R^4$ is selected from C(O)O(C1–C6 alkyl) and C1–C5 alkyl and A is oxygen.

19. A process according to claim 18, wherein the deuterated leuco dyes are selected from the group consisting of tris(N,N-dimethylaminophenyl)-1-deuteromethane, tris(N,N-diethylaminophenyl)-1-deuteromethane, bis(4-N,N-diethylaminophenyl)(2-methyl-4-N,N-diethylaminophenyl)-1-deuteromethane, (4-N,N-(Diethylaminophenyl)bis(2-methyl-4-N,N-diethylaminophenyl)-1-deuteromethane, tris(2-methyl-4-N,N-diethylaminophenyl)-1-deuteromethane, and 2-[9-(diethylamino)-12H-benzo[a]xanthen-12-yl] benzoic acid methyl ester.

20. A process according to claim 19, wherein the photooxidant is selected from a hexarylbiimidazole compound.

21. A process according to claim 20 wherein the deuterated leuco dyes are selected from the group consisting of tris(N,N-diethylaminophenyl)-1-deuteromethane, bis(4-N,N-diethylaminophenyl)(2-methyl-4-N,N-diethylaminophenyl)-1-deuteromethane, (4-N,N-Diethylaminophenyl)bis(2-methyl-4-N,N-diethylaminophenyl)-1-deuteromethane, tris(2-methyl-4-N,N-diethylaminophenyl)-1-deuteromethane, and [2-[9-(diethyl amino)-12H-benzo[a]xanthen-12-yl]-methyl ester] 2-[9-(diethylamino)-12H-benzo[a]xanthen-12-yl]benzoic acid methyl ester, and the hexaarylimidazole compound is selected from the group consisting of 2,2'-bis(o-chlorophenyl)-4,4',5,5'-tetraphenyl-1,1'-biimidazole, 2,2',4,4'-tetrakis(o-chlorophenyl)-5,5'-bis(m,p-dimethoxyphenyl) bisimidazole, 2-(o-chlorophenyl)-4,5-bis(m-methoxyphenyl)-imidazole dimer, and 2,2'-bis(2,3,5-trichlorophenyl)-4,4',5,5'-tetraphenyl-1,1'-biimidazole.

22. The process according to claim 14 wherein the deuterated leuco dye is present in at least 0.1% by weight of the total composition, and the photooxidant is present in at least 0.1% of the total composition.

23. The process according to claim 14 which further comprises a binder polymer and a photodeactivation compound.

24. The process according to claim 14 wherein the composition, containing at least 0.1 weight percent of the leuco dye, upon imagewise exposure to actinic radiation to form imaged and non-imaged areas in the composition, affords imaged areas having an optical density of at least 0.2

* * * * *